United States Patent
Umansky et al.

(10) Patent No.: US 6,868,080 B1
(45) Date of Patent: Mar. 15, 2005

(54) VOICE OVER INTERNET PROTOCOL CALL FALLBACK FOR QUALITY OF SERVICE DEGRADATION

(75) Inventors: Ilya Umansky, San Jose, CA (US); Neil Joffe, Mountain View, CA (US); Shamim Sharifuddin Pirzada, San Jose, CA (US); Dhaval N. Shah, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/492,423

(22) Filed: Jan. 27, 2000

(51) Int. Cl.[7] .............................................. H04L 12/66
(52) U.S. Cl. ..................... 370/354; 370/401; 379/88.17; 379/221.01; 709/238
(58) Field of Search ................................ 370/351, 352, 370/354, 355, 356, 389, 401; 379/88.17, 93.01, 93.06, 93.07, 93.09, 221.01, 221.02, 221.07; 709/217, 218, 238, 239, 249

(56) References Cited

U.S. PATENT DOCUMENTS

| | | | | |
|---|---|---|---|---|
| 6,240,462 B1 | * | 5/2001 | Agraharam et al. | ........ 709/238 |
| 6,253,249 B1 | * | 6/2001 | Belzile | ........ 709/249 |
| 6,330,316 B1 | * | 12/2001 | Donak et al. | ........ 379/196 |
| 6,363,065 B1 | * | 3/2002 | Thornton et al. | ........ 370/352 |
| 6,452,922 B1 | * | 9/2002 | Ho | ........ 370/352 |
| 6,480,898 B1 | * | 11/2002 | Scott et al. | ........ 709/238 |
| 6,510,219 B1 | * | 1/2003 | Wellard et al. | ........ 379/211.01 |

FOREIGN PATENT DOCUMENTS

WO WO 97/18665 5/1997

* cited by examiner

Primary Examiner—Alpus H. Hsu
(74) Attorney, Agent, or Firm—Marger Johnson & McCollom, PC

(57) ABSTRACT

The invention provides a way to fallback to a PSTN call at any time during a VoIP call when Quality of Service in a VoIP network falls below some acceptable level. The PSTN fallback calls can be retrieved "midcall" and rerouted back over the VoIP network. This provides optimal utilization of VoIP without sacrificing the quality of the call connection. Calls are cheaper because PSTN fallback calls are only established temporarily for the amount of time that the QoS problem exists on the VoIP network. Call fallback is conducted in a VoIP gateway by first receiving an incoming call. A Voice over IP (VoIP) call is established for the incoming call over the VoIP network. VoIP packets are encoded from the voice signals in the incoming call and sent over the VoIP network. Quality of service of the VoIP network is monitored during the VoIP call and a fallback call is setup over a PSTN network at any time during the VoIP call when the monitored quality of service of the VoIP network degrades. For a time the voice signals from the incoming call are cross connected to both the output for the fallback call and the output for the VoIP call. When a destination gateway starts receiving the voice signals from the fallback call, the VoIP call is dropped. The quality of service on the VoIP network continues to be monitored during the fallback call. A new VoIP call will be reestablished over the VoIP network during the fallback call when the quality of service of the VoIP network improves. Voice from the incoming call is for a time again cross connected to both the fallback call and the new VoIP call. After the destination gateway starts receiving audio packets again over the new VoIP call, the PSTN fallback call is terminated.

37 Claims, 10 Drawing Sheets

VOICE OVER INTERNET PROTOCOL CALL FALLBACK FOR QUALITY OF SERVICE DEGRADATION

BACKGROUND OF THE INVENTION

This invention relates to Voice over Internet Protocol (VoIP) calls and more particularly to a call fallback scheme used when quality of service degrades on the VoIP call.

Voice signals are transmitted over a packet network by first formatting the voice signal data stream into multiple discrete packets. In a Voice Over Internet Protocol call, an originating voice gateway quantizes an input audio stream into packets that are placed onto a packet network and routed to a destination voice gateway. The destination voice gateway decodes the packets back into a continuous digital audio stream that resembles the input audio stream. A codec uses a compression/decompression algorithm on the quantized digital audio stream to reduce the communication bandwidth required for transmitting the audio packets over the network.

The Quality of Service (QoS) of VoIP calls can degrade due to congestion on the packet network or failure of network processing nodes in the packet network. Quality of service can include anything from call sound quality to the ability and responsiveness of the VoIP network in establishing new VoIP calls. IP network reliability has not been proven to be in the same class as a traditional switched Public Services Telephone Network (PSTN). For this reason, many customers request features that place VoIP calls back out on the traditional circuit switched network (hairpinning) when there is IP network congestion or an IP network failure.

Hairpinning calls over the PSTN has several problems. The first is that hairpinning is expensive. A primary reason customers are attracted to VoIP calls is the cost savings over the PSTN network. Rerouting calls over the PSTN network eliminates a portion of that savings. Hairpinning also increases the number of PSTN channels that must be maintained for each customer by a factor of two (in the case of complete VoIP network failure).

Hairpinning is only used at call setup time. Once a VoIP call has gone into the active state, there is no way to then reroute the call through the PSTN network and then synchronize the PSTN call with the VoIP call. Thus, if the QoS of the IP network degrades during a VoIP call, that entire VoIP call will exhibit the degraded quality. If a QoS problem is detected before a new VoIP call is established, that new call can be hairpinned over the PSTN network. However, the remainder of that call continues to be hairpinned over the PSTN network even if the QoS of IP network improves. Thus, the customer continues to be charged for the more expensive PSTN call even though the call could have been reestablished over the IP network with acceptable QoS.

Accordingly, a need remains for a more effective way to provide VoIP call fallback.

SUMMARY OF THE INVENTION

The invention provides a way to fallback to a PSTN call at any time during a VoIP call when Quality of Service in a VoIP network falls below some acceptable level. The PSTN fallback calls can be retrieved "midcall" and rerouted back over the VoIP network. This provides optimal utilization of VoIP without sacrificing the quality of the call connection. Calls are cheaper because PSTN fallback calls are only established temporarily for the amount of time that the QoS problem exists on the VoIP network.

Call fallback is conducted in a VoIP gateway by first receiving an incoming call. A Voice over IP (VoIP) call is established for the incoming call over the VoIP network. VoIP packets are encoded from the voice signals in the incoming call and sent over the VoIP network. Quality of service of the VoIP network is monitored during the VoIP call and a fallback call is set up over a PSTN network at any time during the VoIP call when the monitored quality of service of the VoIP network degrades. For a time the voice signals from the incoming call are cross connected to both the output for the fallback call and the output for the VoIP call. When a destination gateway starts receiving the voice signals from the fallback call, the VoIP call is dropped.

The quality of service on the VoIP network continues to be monitored during the fallback call. A new VoIP call will be reestablished over the VoIP network during the fallback call when the quality of service of the VoIP network improves. Voice from the incoming call is for a time again cross connected to both the fallback call and the new VoIP call. After the destination gateway starts receiving audio packets again over the new VoIP call, the PSTN fallback call is terminated.

The foregoing and other objects, features and advantages of the invention will become more readily apparent from the following detailed description of a preferred embodiment of the invention which proceeds with reference to the accompanying drawings.

DETAILED DESCRIPTION

Figure 1:
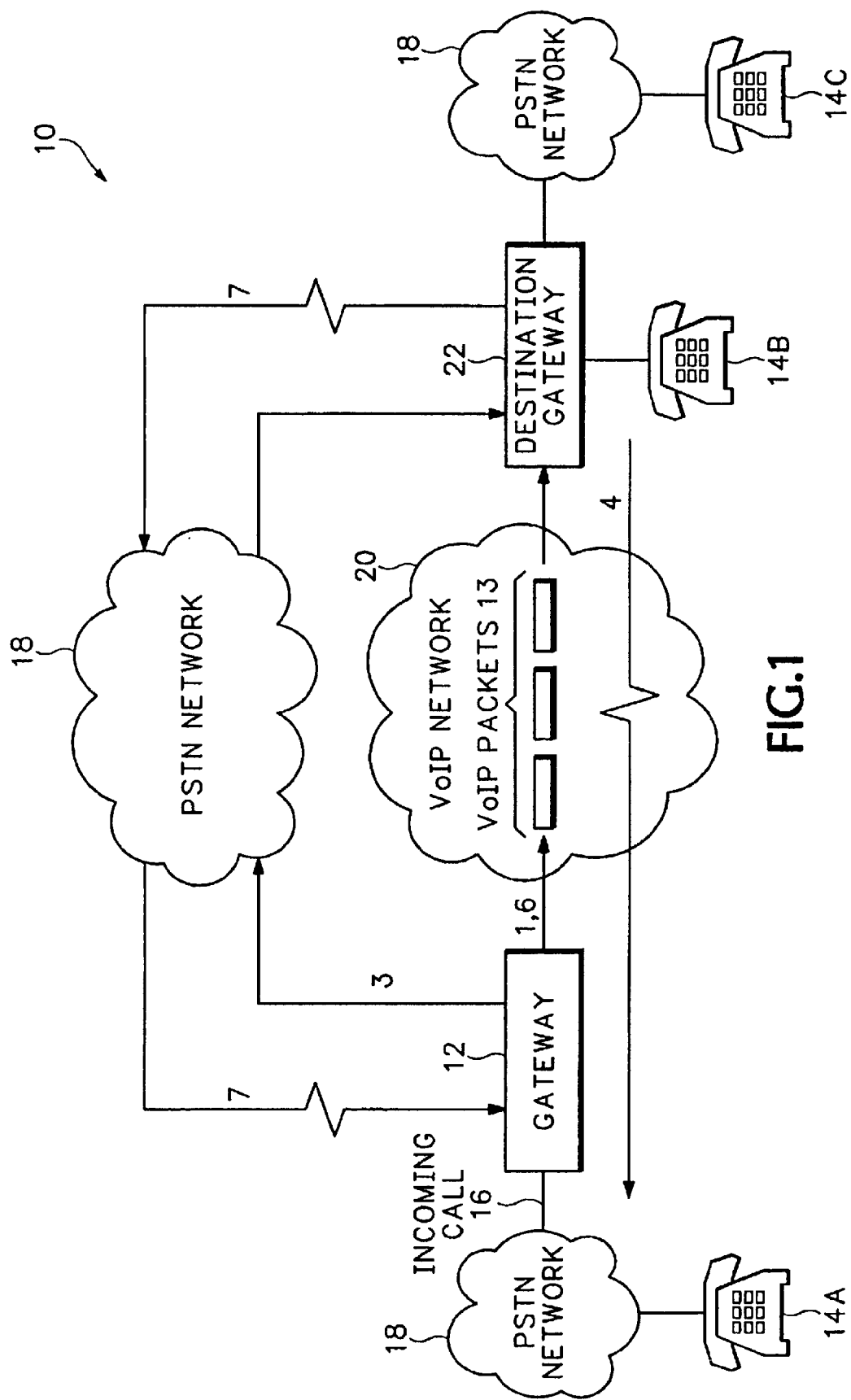
FIG. 1 is schematic diagram of a communications network using call fallback according to the invention.

FIG. 1 shows a communication network 10 that includes a PSTN network 18 and a Voice over Internet Protocol (VoIP) network 20. The PSTN network 18 can include any combination of Integrated Services Digital Network (ISDN) subnetworks and Plain Old Telephone Service (POTS) subnetworks that carry analog and digital voice, video and data. The VoIP network 20 is an Internet Protocol (IP) packet switched network that transfers packets containing voice, video or other data between different IP addresses. An originating gateway 12 receives incoming calls 16 from different endpoints such as a telephone 14A. The incoming calls 16 can be analog calls sent over DS0 channels, ISDN calls or any other call sent over a communications network.

Pursuant to receiving the incoming call 16, the originating gateway 12 normally establishes a VoIP call 1 with a destination gateway 22 associated with a destination phone number associated the incoming call 16. The originating gateway 12 converts the incoming call 16 into VoIP packets 13 and sends the VOIP packets 13 over the VoIP network 20 to the destination gateway 22. The destination gateway 22 receives and then converts the VoIP packets 13 back to audio signals. The audio signals are then either output to another endpoint, such as phone 14B, or sent over another portion of the PSTN network 18 where an endpoint associated with the destination phone number is located, such as phone 14C.

During VoIP call 1, either the originating gateway 12 or the destination gateway 22 detects unacceptable degradation in Quality of Service (QoS) for the in-progress VoIP call 1. Based on the detected QoS, a PSTN fallback call 3 is triggered. The PSTN fallback call 3 is set up through the PSTN network 18. After the fallback call 3 is set up, audio signals from the incoming call 16 are cross connected over the PSTN call 3 to the destination gateway 22. When the destination gateway 22 starts receiving the audio signals over the fallback call 3, the destination gateway 22 terminates the VoIP call I as represented by arrow 4. If QoS improves in the VoIP network 20 during the fallback call 3, a new VoIP call 6 is reestablished through the VoIP network 20. After the destination gateway 22 starts receiving packets again over the new VoIP call 6, the destination gateway 22 drops the PSTN call 3 as represented by arrow 7.

Figure 2:
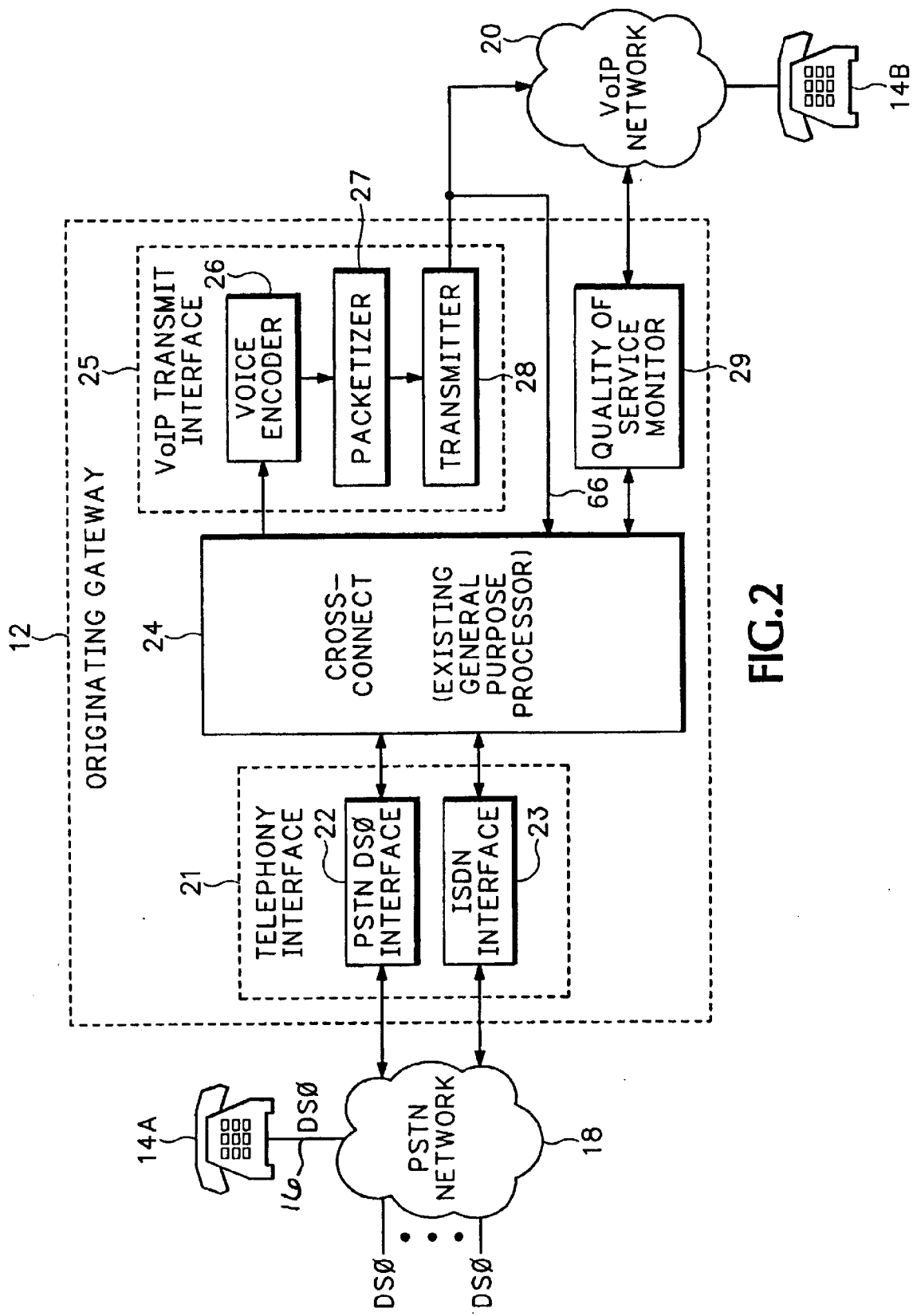
FIG. 2 is a detailed diagram of an originating gateway according to the invention as shown in FIG. 1.

The fallback scheme described above provides seamless PSTN fallback, without interrupting a call in-progress. This fallback scheme also provides uninterrupted switching of an ongoing fallback call on the PSTN network 18 back to the VoIP network 20 when the QoS improves for the VoIP network. Switching calls between the VoIP network 20 and the PSTN network 18 is performed as many times during the call as needed to minimize call cost while maintaining an acceptable level of call quality of service. FIG. 2 is a detailed diagram of the originating gateway 12 shown in FIG. 1. A telephony interface 21 includes multiple PSTN DS0 interfaces 22 and/or multiple ISDN interfaces 23. Each PSTN DS0 interface 22 receives and transmits calls over DS0 channels and each ISDN interface 23 receives and transmits Integrated Services Digital Network (ISDN) calls. A VoIP interface 25 includes a voice encoder 26, a packetizer 27, and a transmitter 28. The voice encoder 26 implements the compression half of a codec. Packetizer 27 accepts compressed audio data from encoder 26 and formats the data into VoIP packets for transmission over the VoIP network 20. Transmitter 28 places the VoIP packets from packetizer 27 onto VoIP network 20.

Of particular importance in the originating gateway 12 is a fallback cross connect 24 that cross connects Time Division Multiplexed audio signals from the incoming calls 16 with either the VoIP interface 25 or the telephony interface 21. The cross connect 24 is typically an existing general purpose processor in the gateway that is coded with additional software that provides the cross connect logic described below. Other implementations of the cross connect 24 are also possible using any logic device, such as with a programmable logic device, etc.

The cross connect 24 is loaded with the computer program (software) that performs the fallback cross connect according to the invention. The computer program is stored in a computer readable media, such as a Dynamic Random Access Memory (DRAM), Read Only Memory (ROM), Electrically Erasable Programmable Read Only Memory (EEPROM), etc.

A quality of service monitor 29 monitors the QoS of the VoIP network 20.

Figure 3:
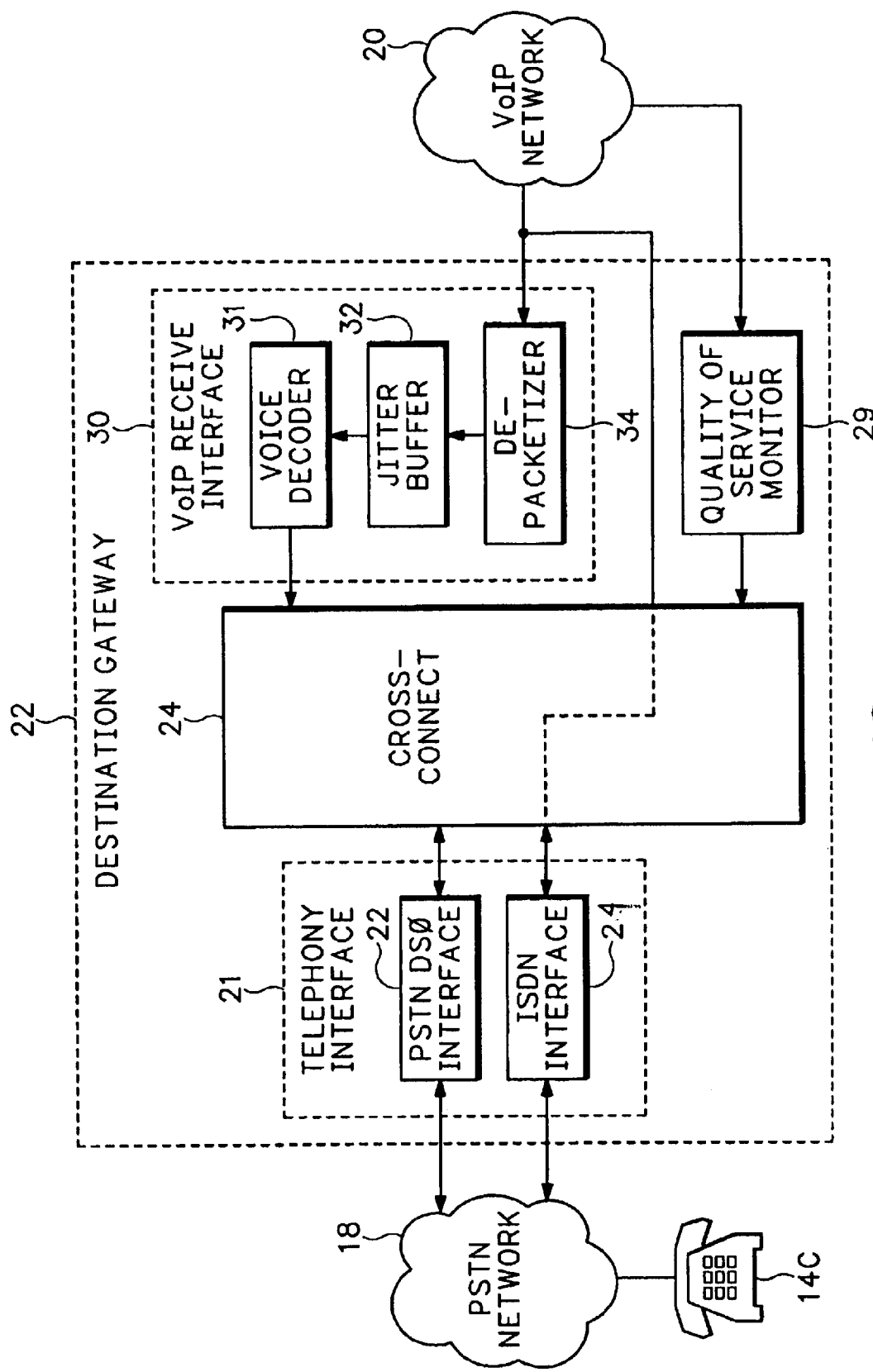
FIG. 3 is a detailed diagram of a destination gateway according to the invention as shown in FIG. 1.

The quality of service monitor 29 is typically VoIP monitoring software that already exists and is provided in the operating system of the gateways. Referring to FIG. 3, the destination gateway 22 shown in FIG. 1 includes the same telephony interface 21 that includes multiple PSTN interfaces 22 and multiple ISDN interfaces 24 as described in the originating gateway 12. The fallback cross connect 24 and the quality of service monitor 29 operate in substantially in the same manner as the cross connect 24 and monitor 29 described in FIG. 2. Particular operations that the cross connect 24 performs in the destination gateway 22 are described below in FIG. 7. A VoIP receive interface couples the VoIP network 20 to the cross connect 24.

The VoIP receive interface 30 reverses the process of the VoIP transmit interface 25 shown in FIG. 2. A depacketizer 34 accepts packets from VoIP network 20 and separates out audio frames. A jitter buffer 32 buffers the audio frames and outputs them to a voice decoder 31 in an orderly manner. The voice decoder 31 implements the decompression half of the codec employed by voice encoder 26 (FIG. 2). The decoded audio frames (TDM audio signals) are then output through the fallback cross connect 24 and the telephony interface 21 to PSTN network 18. The operations necessary to transmit and receive audio packets performed by the telephony interface 21, VoIP transmit interface 25 (FIG. 2), and VoIP receive interface 30 are well known and, therefore, not described in further detail.

It should be understood that the circuitry and functions described in the originating gateway 12 and the destination gateway 22 typically exist in every gateway that provides call fallback according to the invention. However, for clarity, only operations particular to originating a fallback call are described for originating gateway 12 and only operations particular to receiving a fallback call are described for destination gateway 22.

Figure 4A:
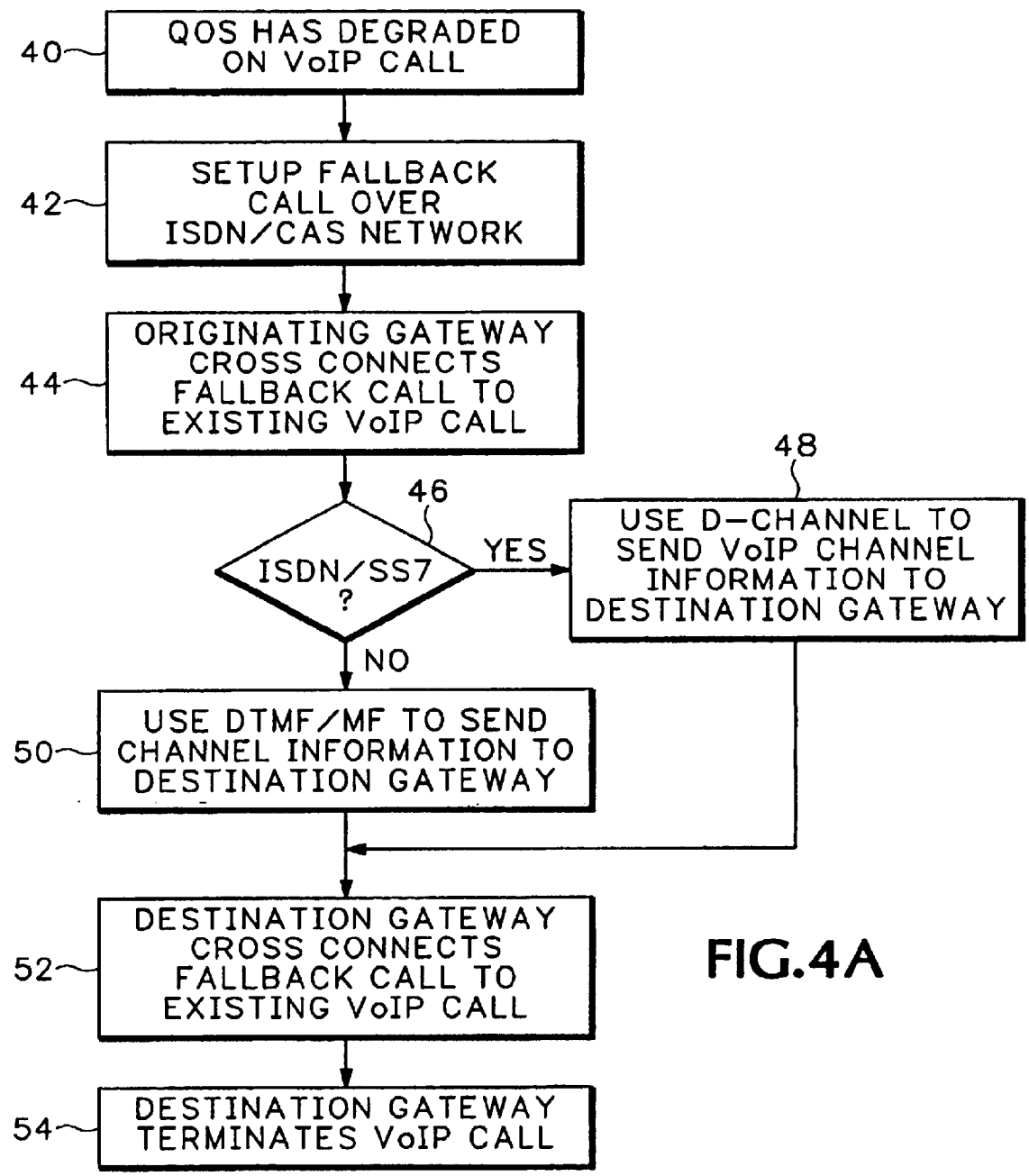
FIGS. 4A–4B are flow diagrams explaining how the call fallback scheme of the invention operates in the originating gateway and destination gateway shown in FIGS. 2 and 3.

FIG. 4A is a flow chart describing in further detail how the originating gateway 12 and the destination gateway 22 in FIGS. 2 and 3, respectfully, perform seamless PSTN fallback, without interrupting an in-progress VoIP call. The cross connect 24 in block 40 determines from the quality of service monitor 29 (FIGS. 2 and 3) that QoS has degraded for a current VoIP call.

The cross connect 24 sets up a PSTN fallback call through the telephony interface 21 in block 42. If the fallback call is over the ISDN interface 23 (FIG. 2), ISDN signaling is used to setup the fallback call. If the fallback call is made over a DS0 channel, CAS signaling is used to setup the fallback call. CAS is a form of signaling used on a T1 line. With CAS, a signaling element is dedicated to each channel in a T1 frame. The T1 CAS feature enables call signaling (such as on-hook and off-hook) through each channelized T1 line.

In block 44, the cross connect 24 in the originating gateway 12 cross connects the incoming call to the existing VoIP call to the PSTN fallback call.

This is described in further detail below in FIGS. 5–9. If ISDN or SS7 signaling is available for the PSTN fallback call in decision block 46, then a D-channel in the fallback call connection is used in block 48 to send VoIP call and fallback call information to the destination gateway 22. Common Channel Signaling System No. 7 (SS7) is a global standard for telecommunications by which network elements in the PSTN network exchanges information to effect call setup, routing and control. If the fallback call does not have ISDN/SS7 signaling available, then Dual Tone Multi-Frequency (DTMF/MF) signals are sent to the destination gateway 22 in block 50 to identify the fallback call with the VoIP call.

Alternatively, in case of ISDN if voice is transmitted as packets over the fallback, no signaling is needed to relate fallback and non-fallback channels. Each packet carries the channel information in its packet header. More than one call can be routed over a single ISDN fallback channel depending on the voice codec used. The destination gateway 22 cross connects the fallback call to the existing VoIP call in block 52. The destination gateway 22 then terminates the VoIP call in block 54.

Figure 4B:
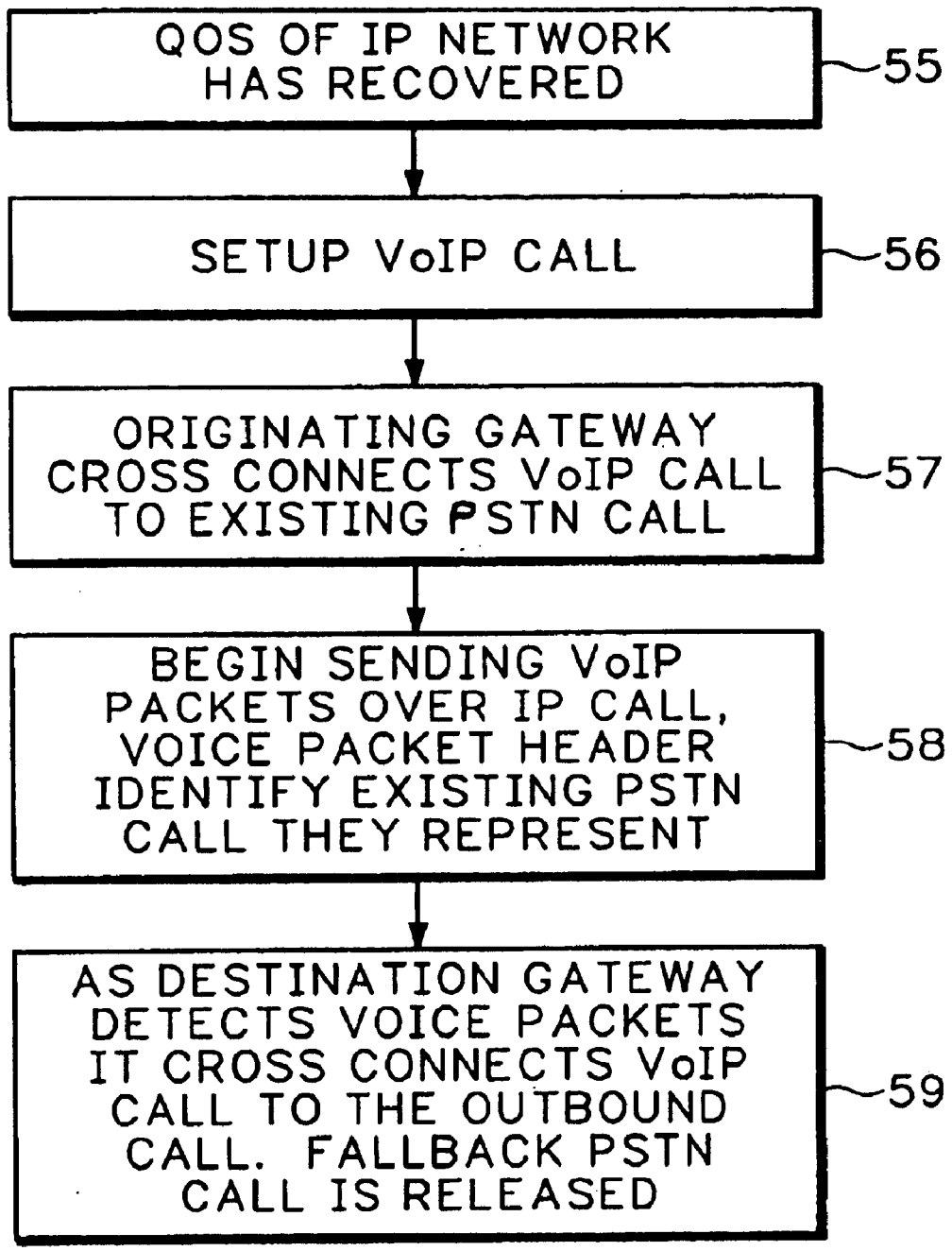

FIG. 4B is a flow diagram that shows how the invention reverts back to a VoIP call once the VoIP network 20 has recovered. In block 55 the originating or destination gateway determines that the QoS for the VoIP network 20 has recovered. In block 56 a new VoIP call is setup between the originating gateway 12 and the destination gateway 22. The originating gateway 12 in block 57 cross connects the VoIP call to the existing PSTN call. In block 58, the originating gateway 12 begins sending VoIP packets for the incoming call through the new VoIP call. The headers in the VoIP packets identify the existing PSTN call that the VoIP packets represent. When the destination gateway detects the voice packets, the VoIP call is cross connected to an outbound call in block 59. The PSTN call is then released.

Figure 5:
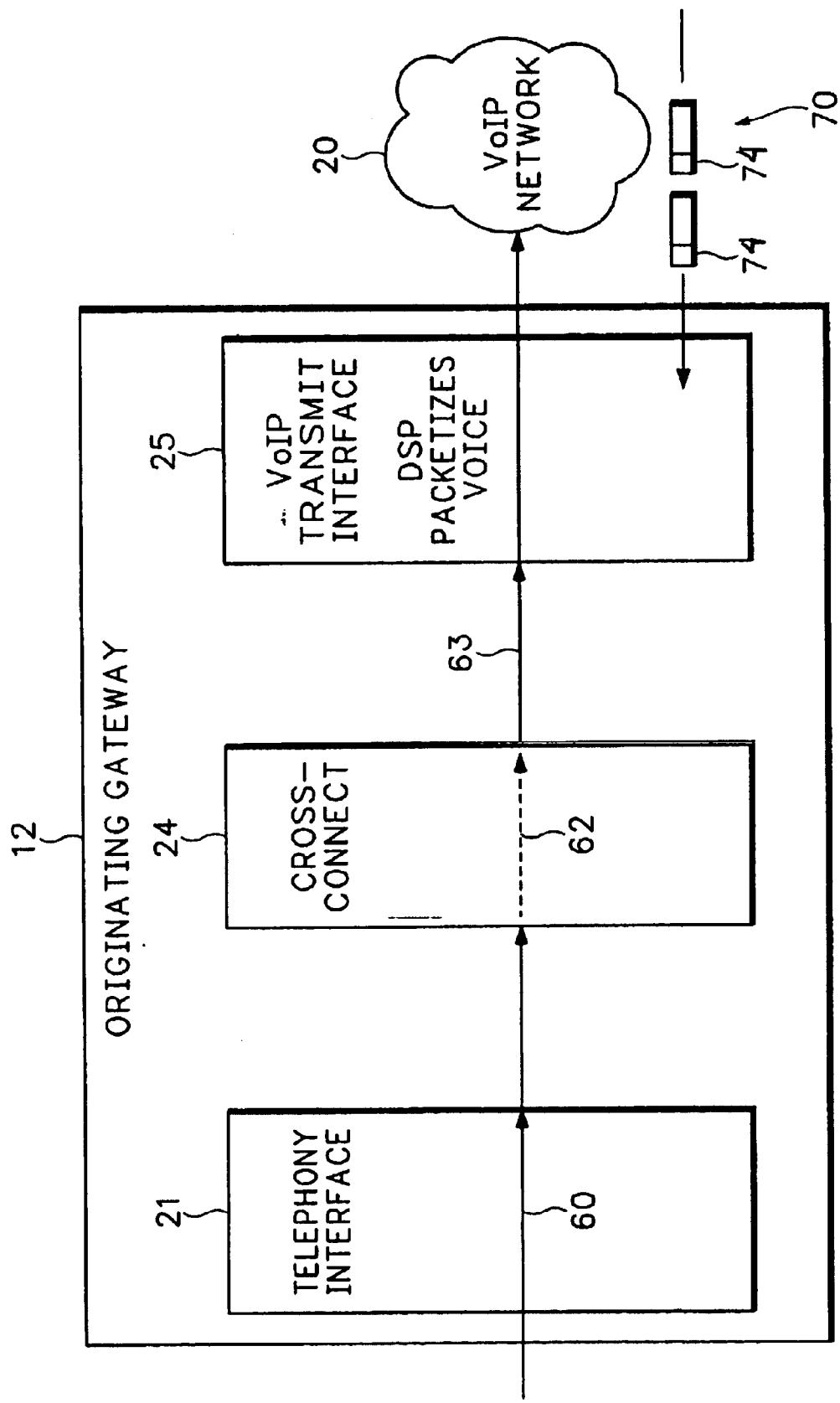
FIGS. 5–9 show step-by-step how the gateways in FIGS. 2 and 3 perform call fallback according to the invention.

FIGS. 5–9 show the different cross connections made by the cross connect 24 during a fallback session. Referring first to FIG. 5, when the originating gateway 12 receives an incoming call 60. The cross connect 24 provides a cross connection 62 that cross connects the PSTN voice channel for the incoming call 60 to a DSP channel in the VoIP transmit interface 25 for a VoIP call 63. The voice signals from the incoming call 60 are packetized by the VoIP interface 25 and sent out over the VoIP network 20 as VoIP packets 70. The VoIP packets 70 include headers 74 that provide VoIP call information including call identification, call destination, packet sequence, etc.

Figure 6:
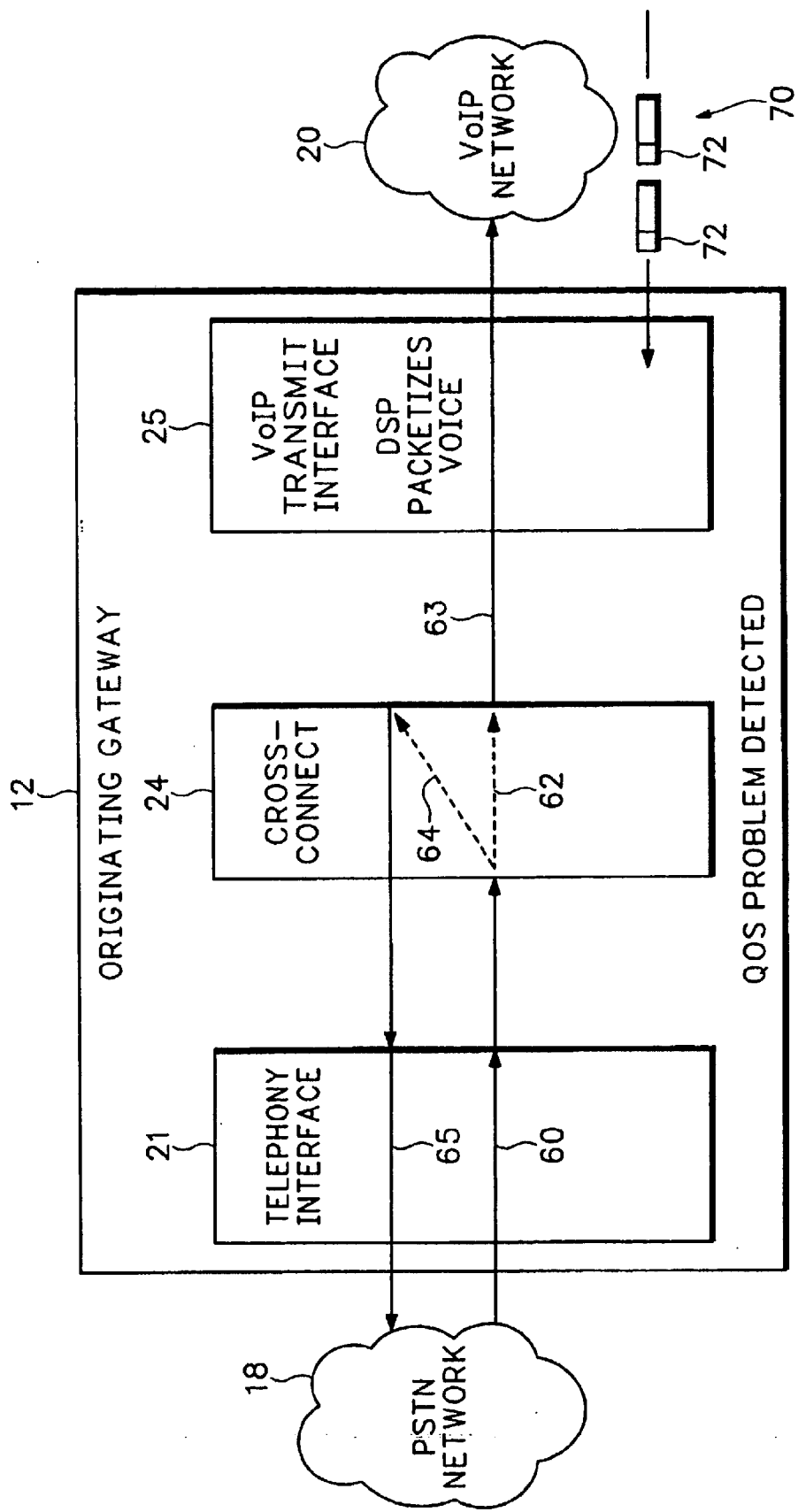

Referring to FIG. 6, if QoS degradation is detected, an outgoing fallback call 65 is made to the same destination gateway 22 over a PSTN channel. Once the originating gateway 12 receives a call answer from the destination gateway 22, the cross connect 24 cross connects the DSO channel for the incoming call 60 to the outgoing PSTN channel for the outgoing fallback call 65. The incoming call 60 then continues over the PSTN fallback call 65.

The incoming call 60 is output for a time by cross connections 62 and 64 to both the outgoing channel of the VoIP call 63 and the outgoing channel for the PSTN fallback call 65. During this time, destination gateway 22 receives voice signals for the same incoming call 60 from both the VoIP call 63 and the PSTN fallback call 65. The destination gateway 22 is notified that the VoIP call 63 and the PSTN call 65 carry the same voice signals by sending tones over the fallback call 65.

Figure 7:
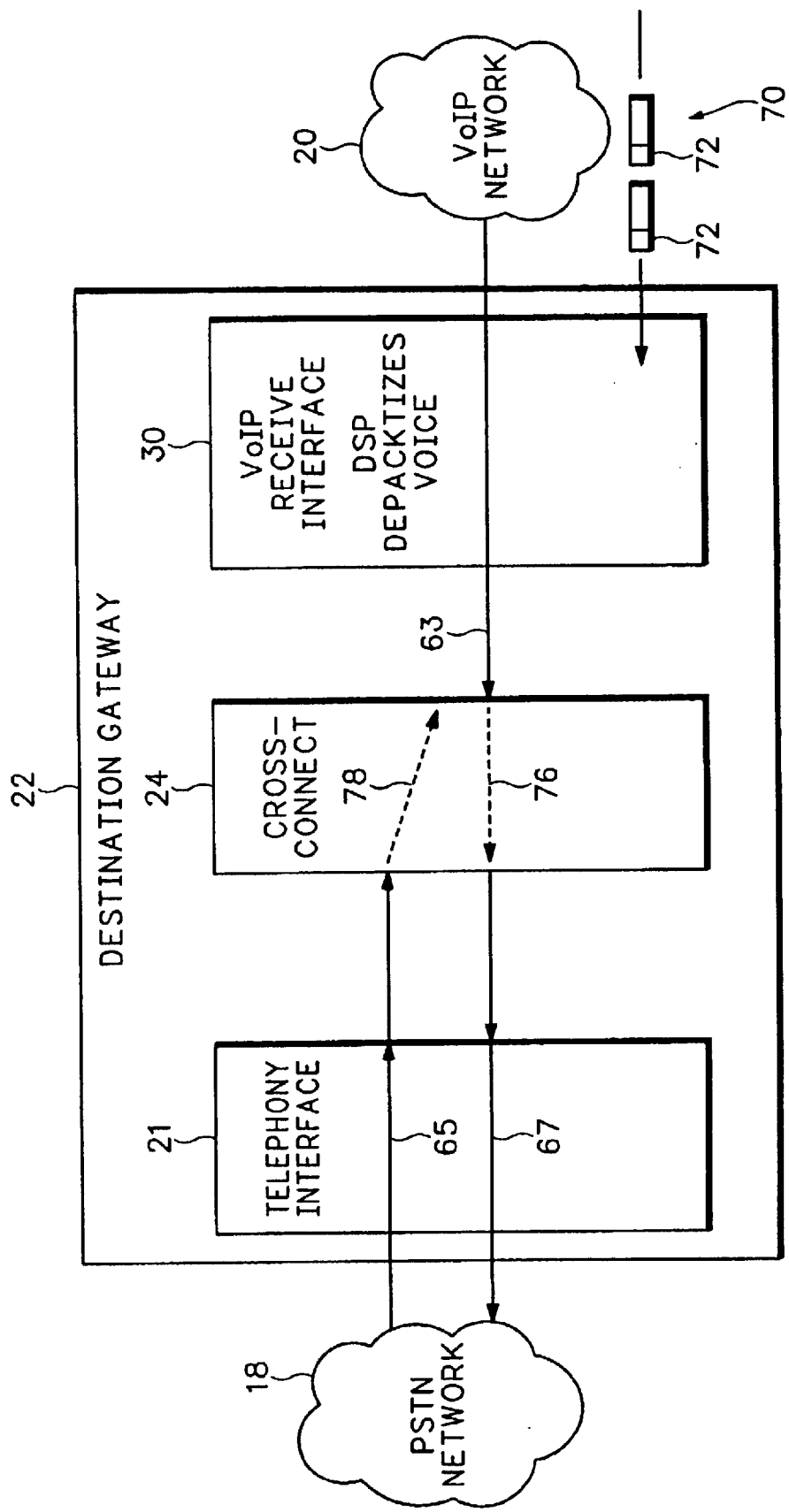

Referring to FIG. 7, the telephony interface 21 in the destination gateway 22 receives the PSTN fallback call 65. At the same time, the VoIP receive interface 30 continues to receive and decode VoIP packets 70 from the VoIP call 63. TDM voice signals from the decoded VoIP packets 70 are sent by cross connection 76 to an off-ramp DSO channel on outgoing call 67.

As described above in FIG. 1, the outgoing call 67 may be sent directly to a destination endpoint or sent over another portion of the PSTN network before reaching the destination endpoint. The destination gateway 22 finishes playing whatever audio packets 70 remain in the jitter buffer 32 (FIG. 3). The cross connect 24 then uses cross connections 78 and 76 to cross connect the incoming PSTN channel for PSTN fallback call 65 to the outgoing PSTN channel of outgoing call 67. The cross connect 24 then drops the VoIP call 63 and signals to the originating gateway 12 over the fallback call 65 that the VoIP call 63 is closed.

The destination gateway 22 can also detect a QoS degradation. The destination gateway 22 then acts in a manner similar to the originating gateway 12. The destination gateway 22 establishes a PSTN fallback call to the originating gateway 12 and signals what VoIP session the PSTN fallback call concerns. This is not necessary if voice is sent in packets over an ISDN connection since the packets in the ISDN call will identify the VoIP call. The originating gateway 12 then routes calls over the established PSTN fallback call.

Figure 8:
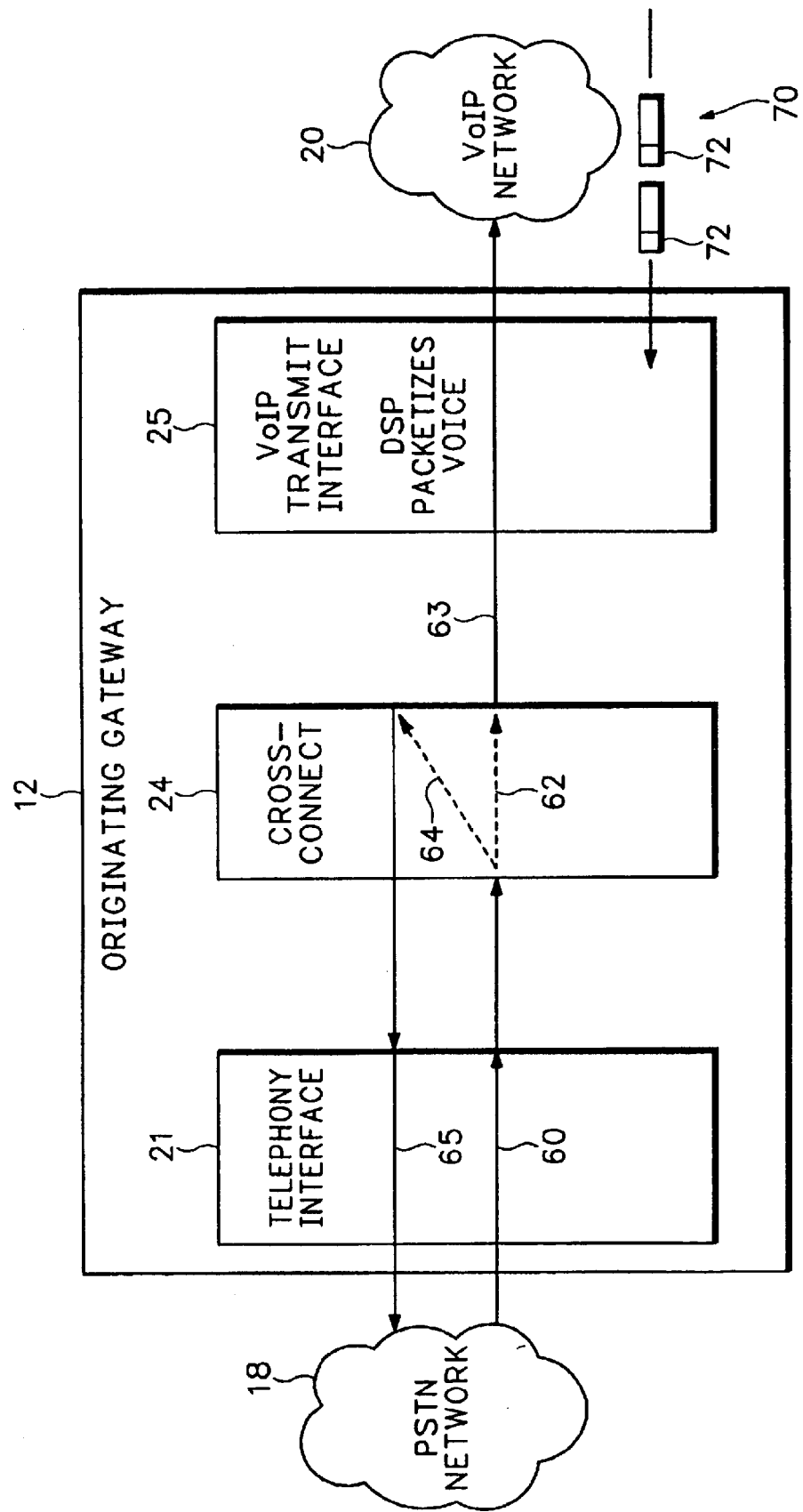

Referring to FIG. 8, once QoS conditions on the VoIP network 20 improve, call(s) carried by the PSTN fallback call 65 are seamlessly rerouted back over a new VoIP call 68 and the PSTN fallback call 65 is torn down. The cross connect 24 establishes a new VoIP call 68 to the destination gateway 22 and uses connection 62 to cross connect audio signals from the incoming call 60 to the new VoIP call 68. The incoming call 60 is now cross connected to two output channels, the output channel for VoIP call 68 and the output channel for PSTN fallback call 65.

For some time, destination gateway 22 will receive the voice signals from the same incoming call 60 over both the PSTN call 65 and the new VoIP call 68. Destination gateway 22 is signaled in the headers 72 of the VoIP packets 70 that the VoIP call 68 and the fallback call 65 carry voice from the same incoming call 60. Once the destination gateway 22 starts receiving the voice packets 70, the PSTN fallback call 65 is disconnected by the destination gateway 22. From this point on voice from the incoming PSTN call 60 is carried completely over the VoIP call 68.

For better synchronization of the voice streams when switching from/to PSTN and VoIP, a time stamp on the VoIP voice packets can be used. The time stamp can be compared to the real time to determine the best point in time to switch the voice stream. For example, when a fallback call is to be cross connected to the destination gateway output, the destination gateway can compare the time stamp in the VoIP packet with the actual time of day when the signals for the fallback are received. As soon as the destination receives and then outputs the packets for that identified time, the cross connects switches the fallback call to the output and the primary VoIP call is dropped.

In most cases it is not possible to hit a voice packet that exactly matches the actual time since there is always some packet delay in the VoIP network. So, the fallback is performed when the difference between the received time stamp and the time of day is at some minimal value. The cross connect 24 could also look ahead into the jitter buffer 32 and see at what packet time stamp converges best with the actual time.

Figure 9:
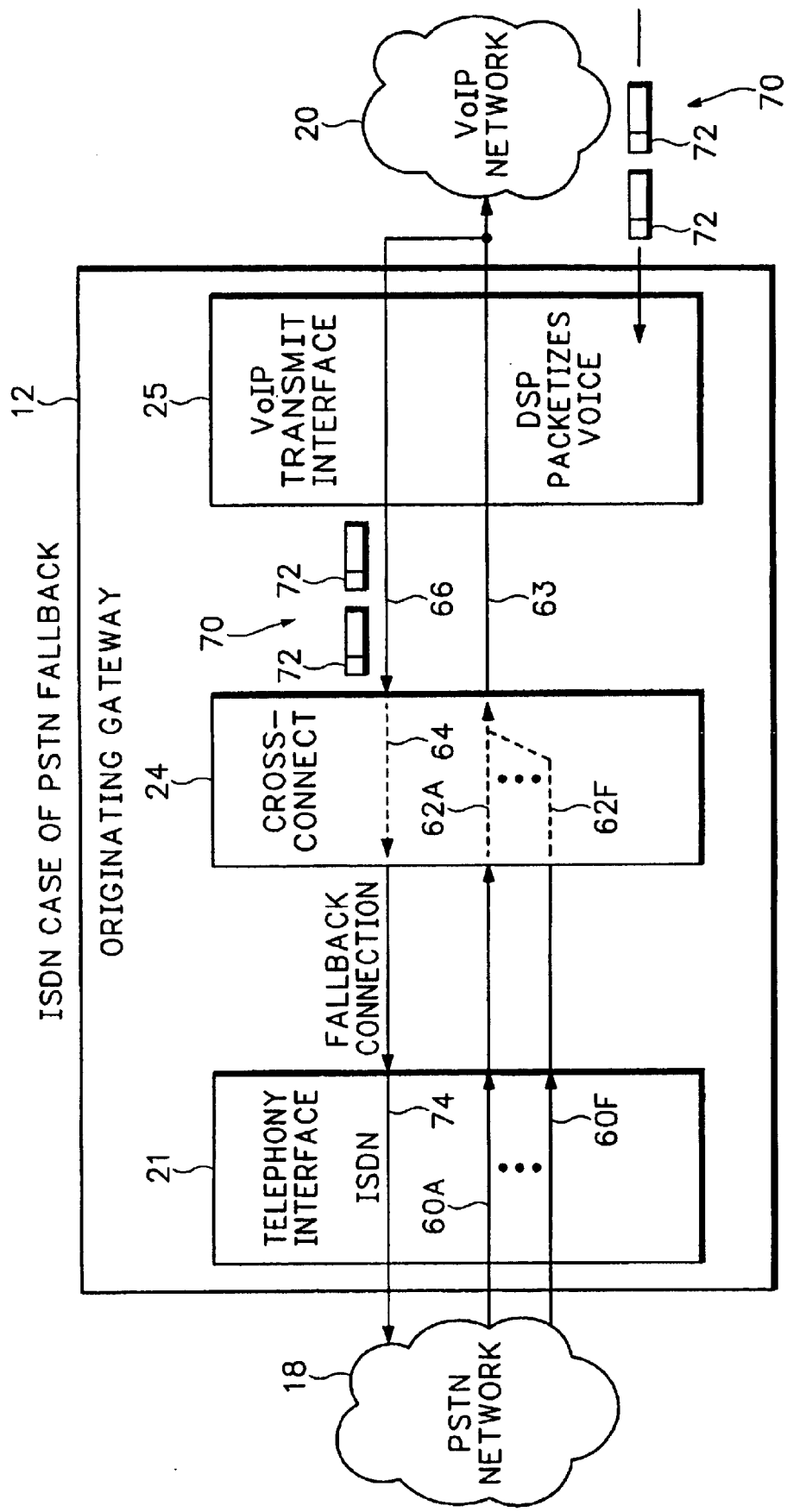

FIG. 9 shows another aspect of the invention. Instead of cross connecting the incoming call 60 from a DSO channel to a fallback call 65 on an outgoing DSO channel (FIG. 6), the incoming call 60 is cross connected to a fallback call 74 on a outgoing ISDN channel. With an ISDN fallback call 74, the cross connect 24 continues to route the incoming call 60 via connection 62 through the VoIP interface 25 and out the VoIP call 63. The VoIP interface 25 encodes the voice on the incoming call 60 into voice packets 70. However, the voice packets 70 are routed back through path 66 and connection 64 to the ISDN channel for ISDN fallback call 74. One channel on the ISDN fallback call 74 can carry packet traffic for multiple incoming DSO calls 60A–60F (likely up to six, depending on the codec used). The headers 72 in VoIP packets 70 identify the VoIP packets with one of the incoming calls 60A–60F.

In the case of ISDN fallback, when one or more of the incoming calls 60A–60F are received, originating gateway 12 first checks to see if there is already an existing ISDN fallback call that is carrying other calls to the same destination gateway. If any incoming calls 60A–60F are targeted to the same destination gateway as an existing ISDN fallback call 74, and if bandwidth allows, ISDN call 74 is used to carry those other call(s) 60A–60F. Otherwise, a new fallback call is established to the destination gateway.

The invention contributes and simplifies new incoming call admission control. A new incoming call will not be accepted by the originating gateway 12 if there are already incoming calls in-progress that are using PSTN fallback to the same targeted destination gateway.

Measuring Quality of Service (QoS) of the VoIP network 20 for initiating call fallback can be determined in a variety of different ways. One QoS measurement is determined by the amount of time it takes audio packets to travel between the originating gateway 12 and the destination gateway 22. This end-to-end delay is calculated using existing packet based voice protocols, such as Real Time Protocol (RTP RFC 1889) and Real Time Control Protocol (RTCP). RTP provides end-to-end transport for applications of streaming or real-time data, such as audio or video. RTCP provides estimates of network performance.

RTP and RTCP also enable the destination gateway 22 to synchronize the packets received from the originating gateway 12 in the proper order so a user hears or sees the information correctly. Logical framing defines how the protocol "frames" or packages the audio or video data into bits (packets) for transport over a selected communications channel. Sequence numbering determines the order of data packets transported over a communications channel. RTCP also contains a system for determining end-to-end delay and periodically reporting that end-to-end delay back to the originating gateway 12. Any other dynamic measure of end-to-end delay, network congestion, network failures, etc. can similarly be used as a Quality of Service identifier to the gateways 12 and 22.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A method for conducting call fallback in a gateway, comprising:

receiving an incoming call;

establishing a Voice over IP (VoIP) call over a VoIP network;

generating audio packets from the incoming call and sending the audio packets over the VoIP call;

monitoring quality of service on the VoIP network during the VoIP call;

setting up a fallback call over a circuit switched network during the VoIP call when the monitored quality of service of the VoIP network degrades;

cross connecting the incoming call to both the fallback call and the VoIP call during midcall of the VoIP call after the fallback call has been setup and sending same audio data over both fallback call and the VoIP call at the same time; and redirecting the incoming call from the currently established VoIP call to the fallback call.

2. A method according to claim 1 including:

terminating the VoIP call;

continuing monitoring quality of service on the VoIP network during the fallback call;

establishing a new VoIP call during the fallback call when the quality of service of the VoIP network improves;

cross connecting the incoming call to both the fallback call and the new VoIP call when the new VoIP call is established;

sending audio packets encoded from the incoming call over the new VoIP call; and terminating the fallback call.

3. A method according to claim 2 including signaling that the new VoIP call is associated with the fallback call by identifying the fallback call in headers of the audio packets sent over the new VoIP call.

4. A method according to claim 1 including:

establishing the fallback call over either an ISDN fallback call having an outgoing ISDN channel or a DS0 fallback call having an outgoing PSTN DS0 channel;

receiving the incoming call over an incoming PSTN DS0 channel;

cross connecting the incoming call for a DS0 fallback call by cross connecting the incoming PSTN DS0 channel to the outgoing PSTN DS0 channel and then terminating the generation of audio packets from the incoming call;

cross connecting the incoming call for an ISDN fallback call by continuing generation of audio packets from the incoming call and rerouting the audio packets over the outgoing ISDN channel.

5. A method according to claim 1 wherein setting up the fallback call comprises:

detecting when the quality of service for the VoIP call has degraded below a predetermined level;

identifying any already established ISDN call with a same destination gateway as the VoIP call;

determining if the identified ISDN call has bandwidth capacity for carrying the VoIP call; and using the ISDN call identified with sufficient bandwidth capacity as the fallback call for the VoIP call.

6. A method according to claim 1 including:

generating audio packets for multiple incoming calls;

setting up the fallback call as an ISDN connection;

cross connecting the audio packets for the multiple incoming calls over that same ISDN connection at the same time.

7. A method according to claim 1 including:

receiving in an input buffer the audio packets from the VoIP call;

receiving audio signals from the fallback call and at the same time receiving the audio packets from the VoIP call; and disconnecting the VoIP call when the audio packets in the input buffer have been played out.

8. A method according to claim 1 including:

receiving a new incoming call;

identifying any previously received incoming calls that are currently cross connected over fallback calls to a destination gateway targeted for the new incoming call; and preventing the new incoming call from being established as a new VoIP call when any previously received incoming calls are identified.

9. A method according to claim 1 wherein setting up the fallback call includes sending signaling in the fallback call that associates the fallback call with the VoIP call.

10. A method according to claim 9 wherein the signaling comprises ISDN signaling, SS7 signaling or DTMF signaling.

11. A method according to claim 1 including:
sending time stamps in the audio packets of the VoIP call;
identifying a fallback call receive time when the fallback call is received at a destination gateway;
comparing the packet time stamps with the identified fallback call receive time; and
cross connecting the fallback call to an output of the destination gateway when one of the time stamps converge with the fallback call receive time.

12. A VoIP gateway, comprising:
a telephony interface for receiving an incoming call;
a VoIP interface for encoding the incoming call into audio packets; and sending the audio packets over a VoIP network; and
a cross connect that sets up a fallback call over the telephone interface and cross connects the incoming call to the fallback call sending audio data over the fallback call at the same time that the same audio signals for the incoming call is are being encoded into audio packets and sent over the VoIP call.

13. A VoIP gateway according to claim 12 wherein the cross connect receives a quality of service measurement for the VoIP network and cross connects the incoming call to the fallback call when the quality of service of the VoIP network degrades.

14. A VoIP gateway according to claim 12 wherein cross connect:
receives a termination signal back from a destination gateway to terminate the VoIP call after audio signals from the incoming call has been received by the destination gateway over the fallback call;
terminates the VoIP call by disabling the VoIP interface from encoding and sending the audio packets from the incoming call over the VoIP network;
monitors the quality of service on the VoIP network during the fallback call after the VoIP call has been terminated;
establishes a new VoIP call when the quality of service improves;
reenables the VoIP interface to encode and send audio packets from the incoming call over the new VoIP call; and
terminates the fallback call after receiving confirmation from the destination gateway that the audio packets are being received.

15. A VoIP gateway according to claim 12 wherein the fallback call is established as an ISDN fallback call having an outgoing ISDN channel or an outgoing PSTN DSO fallback call having an outgoing PSTN DSO channel.

16. A VoIP gateway according to claim 15 wherein:
the incoming call is received over an incoming PSTN DSO channel;
the cross connect cross connects the incoming call directly to the outgoing PSTN DSO channel when the fallback call is the PSTN DSO fallback call; and
the VoIP interface reroutes the audio packets encoded for the incoming call to the outgoing ISDN channel when the fallback call is the ISDN fallback call.

17. A VoIP gateway according to claim 12 wherein the cross connect establishes the fallback call over the telephony interface as follows:

detecting when the quality of service for the VoIP call has degraded below a predetermined level;
identifying any existing ISDN fallback call on the telephony interface currently established with a destination gateway that is also receiving the VoIP call;
determining whether the existing ISDN fallback call has bandwidth available for carrying the VoIP call;
using any identified ISDN fallback call with available bandwidth as the fallback call for the VoIP call; and
establishing a new fallback call on the telephony interface when there is no identified ISDN fallback call already established with the destination gateway having available bandwidth capacity.

18. A VoIP gateway according to claim 15 wherein the telephony interface receives multiple different incoming calls all directed to the same destination gateway and the cross connect cross connects the audio packets for the multiple different incoming calls over the same outgoing IDSN channel.

19. A VoIP gateway according to claim 12 wherein the cross connect prevents any new incoming call from being sent over the VoIP network when any fallback call is directed to a same destination gateway as the new incoming call.

20. A VoIP gateway, comprising:
a VoIP interface receiving audio packets from an incoming VoIP call, decoding the audio packets, and outputting the decoded audio packets to an outgoing telephony call;
a telephony interface for receiving a fallback call during the in-progress VoIP call containing same audio data contained in the audio packets and receiving signaling that associates the fallback call with the VoIP call; and
a cross connect that cross connects the fallback call to the outgoing telephony call of the associated VoIP call and drops the VoIP call after receiving audio signals over the fallback call.

21. A VoIP gateway according to claim 20 including a buffer for receiving the audio packets, the cross connect dropping the VoIP call after the VoIP interface has decoded all the audio packets in the buffer.

22. A VoIP gateway according to claim 20 wherein an operating system in the VoIP gateway monitors the quality of service of the VoIP network and sends a signal to an originating gateway to initiate the fallback call when the quality of service of the VoIP network degrades.

23. A VoIP gateway according to claim 20 wherein the cross connect:
sends a termination signal back to an originating gateway to terminate the VoIP call after receiving a voice signal from the originating gateway through the fallback call;
continues monitoring the quality of service on the VoIP network during the fallback call after the VoIP call has been terminated;
sends a request to the originating gateway to establish a new VoIP call when the quality of service of the VoIP network improves; and
terminates the fallback call after the new VoIP call has been established and VoIP packets from the new VoIP call have been received.

24. A VoIP gateway according to claim 20 wherein the fallback call is either an ISDN fallback call or a PSTN DSO fallback call.

25. A VoIP gateway according to claim 20 wherein;
the fallback call contains audio packets;
the VoIP interface decodes the audio packets from the fallback call; and the cross connect cross connects the decoded audio packets from the fallback call to the telephony interface.

26. A VoIP gateway according to claim 20 wherein:

the telephony interface receives VoIP packets from multiple different incoming calls on the same fallback call;

the VoIP interface decodes the VoIP packets from the different incoming calls on the same fallback call; and the cross connect cross connects the decoded audio packets from that same fallback call to different outputs on the telephony interface.

27. A computer readable medium for use with a network processing device, the computer readable medium comprising instructions that when executed by the network processing device perform the following:

detecting an incoming call;

initiating a Voice over IP (VOIP) call over a VoIP network for the incoming call that generates audio packets from the incoming call and sends the audio packets over the VoIP call;

monitoring quality of service on the VoIP network during the VoIP call;

initiating a fallback call over a circuit switched network during the VoIP call when the monitored quality of service of the VoIP network degrades;

cross connecting the incoming call to both the fallback call and the VoIP call during midcall of the VoIP call after the fallback call has been setup and sending same audio data over both the fallback call and the VoIP call at the same time; and redirecting the incoming call from the currently established VoIP call to the fallback call.

28. A computer readable medium according to claim 27 including instructions that when executed by the network processing device include:

initiating termination of the VoIP call;

maintaining monitoring quality of service on the VoIP network during the fallback call;

initiating establishment of a new VoIP call during the fallback call when the quality of service of the VoIP network improves;

cross connecting the incoming call to both the fallback call and the new VoIP call when the new VoIP call is established, audio packets encoded from the incoming call sent over the new VoIP call; and initiating termination of the fallback call.

29. A computer readable medium according to claim 28 including instructions that when executed by the network processing device include identifying the new VoIP call with the fallback call using headers in the audio packets sent over the new VoIP call.

30. A computer readable medium according to claim 27 including instructions that when executed by the network processing device include:

initiating establishment of the fallback call over either an ISDN fallback call having an outgoing ISDN channel or a DS0 fallback call having an outgoing PSTN DS0 channel;

detecting receipt of the incoming call over an incoming PSTN DS0 channel;

cross connecting the incoming call for a DS0 fallback call by cross connecting the incoming PSTN DS0 channel to the outgoing PSTN DS0 channel and then terminating the generation of audio packets from the incoming call; and cross connecting the incoming call for an ISDN fallback call by continuing generation of audio packets from the incoming call and rerouting the audio packets over the outgoing ISDN channel.

31. A computer readable medium according to claim 27 wherein setting up the fallback call comprises:

detecting when the quality of service for the VoIP call has degraded below a predetermined level;

identifying any already established ISDN call with a same destination gateway as the VoIP call;

determining if the identified ISDN call has bandwidth capacity for carrying the VoIP call; and using the ISDN call identified with sufficient bandwidth capacity as the fallback call for the VoIP call.

32. A computer readable medium according to claim 27 including instructions that when executed by the network processing device include:

generating audio packets for multiple incoming calls;

setting up the fallback call as an ISDN connection;

cross connecting the audio packets for the multiple incoming calls over that same ISDN connection at the same time.

33. A system for use with a network processing device, the system comprising:

means for detecting an incoming call;

means for initiating a Voice over IP (VoIP) call over a VoIP network for the incoming call that generates audio packets from the incoming call and sends the audio packets over the VoIP call;

means for monitoring quality of service on the VoIP network during the VoIP call;

means for initiating a fallback call over a circuit switched network during the VoIP call when the monitored quality of service of the VoIP network degrades;

means for cross connecting the incoming call to both the fallback call and the VoIP call during midcall of the VoIP call after the fallback call has been setup and sending same audio data over both the fallback call and the VoIP call at the same time; and means for redirecting the incoming call from the currently established VoIP call to the fallback.

34. The system according to claim 33 including:

means for initiating termination of the VoIP call;

means for maintaining monitoring quality of service on the VoIP network during the fallback call;

means for initiating establishment of new VoIP call during the fallback call when the quality of service of the VoIP network improves;

means for cross connecting the incoming call to both the fallback call and the new VoIP call when the new VoIP call is established, audio packets encoded from the incoming call sent over the new VoIP call; and means for initiating termination of the fallback call.

35. The system according to claim 34 including identifying the new VoIP call with the fallback call using headers in the audio packets sent over the new VoIP call.

36. The system according to claim 33 including:

means for initiating establishment of the fallback call over either an ISDN fallback call having an outgoing ISDN channel or a DS0 fallback call having an outgoing PSTN DS0 channel;

means for detecting receipt of the incoming call over an incoming PSTN DS0 channel;

means for cross connecting the incoming call for a DS0 fallback call by cross connecting the incoming PSTN DS0 channel to the outgoing PSTN DS0 channel and then terminating the generation of audio packets from the incoming call; and means for cross connecting the incoming call for an ISDN fallback call by continuing generation of audio packets from the incoming call and rerouting the audio packets over the outgoing ISDN channel.

37. The system according to claim 33 wherein the means for setting up the fallback call comprises:

means for detecting when the quality of service for the VoIP call has degrade below a predetermined level;

means for identifying any already established ISDN call with a same destination gateway as the VoIP call;

means for determining if the identified ISDN call has bandwidth capacity for carrying the VoIP call; and means for using the ISDN call identified with sufficient bandwidth capacity as the fallback call for the VoIP call.

* * * * *

UNITED STATES PATENT AND TRADEMARK OFFICE
CERTIFICATE OF CORRECTION

PATENT NO. : 6,868,080 B1
DATED : March 15, 2005
INVENTOR(S) : Umansky et al.

It is certified that error appears in the above-identified patent and that said Letters Patent is hereby corrected as shown below:

Column 2,
Line 56, replace "DSO" with -- DS0 --.

Column 3,
Line 13, replace "VoIP call I" with -- VoIP call 1 --.
Lines 59 and 60, replace "20. The quality" with -- 20. The quality --.

Column 4,
Line 5, replace "interface couples" with -- interface 30 couples --.
Lines 29 and 41, replace "DSO" with -- DS0 --.
Line 31, (both occurrence) replace "DSO" with -- DS0 --.

Column 5,
Lines 34 and 52, replace "DSO" with -- DS0 --.

Column 6,
Lines 50, 51 and 61, replace "DSO" with -- DS0 --.

Column 8,
Lines 15, 16, 17, 19, 20 and 21, replace "DSO" with -- DS0 --.

Column 9,
Line 23, replace "call is are being" with -- call are being --.
Lines 53, 54, 57, 59 and 60, replace "DSO" with -- DS0 --.

Column 10,
Line 19, replace "IDSN" with -- ISDN --.
Line 61, replace "DSO" with -- DS0 --.

Column 11,
Lines 58, 60, 63, 64, 65 and 66, replace "DSO" with -- DS0 --.

Column 12,
Line 43, replace "call to the fallback." with -- call to the fallback call. --.
Line 49, replace "establishment of new VoIP" with -- establishment of a new VoIP --.

UNITED STATES PATENT AND TRADEMARK OFFICE
CERTIFICATE OF CORRECTION

PATENT NO. : 6,868,080 B1
DATED : March 15, 2005
INVENTOR(S) : Umansky et al.

It is certified that error appears in the above-identified patent and that said Letters Patent is hereby corrected as shown below:

<u>Column 14,</u>
Line 2, replace "call has degrade below" with -- call has degraded below --.

Signed and Sealed this

Twenty-first Day of March, 2006

JON W. DUDAS
*Director of the United States Patent and Trademark Office*

UNITED STATES PATENT AND TRADEMARK OFFICE
CERTIFICATE OF CORRECTION

Page 1 of 1

PATENT NO.        : 6,868,080 C1
APPLICATION NO.   : 09/492423
DATED             : March 15, 2005
INVENTOR(S)       : Ilya Umansky et al.

It is certified that error appears in the above-identified patent and that said Letters Patent is hereby corrected as shown below:

IN THE SPECIFICATIONS:
Column 2, line 42, "imcoming" should read --incoming--

Signed and Sealed this
Eighth Day of February, 2011

David J. Kappos
*Director of the United States Patent and Trademark Office*

US006868080C1

(12) EX PARTE REEXAMINATION CERTIFICATE (6252nd)
United States Patent
Umansky et al.

(10) Number: US 6,868,080 C1
(45) Certificate Issued: *Jun. 10, 2008

(54) VOICE OVER INTERNET PROTOCOL CALL FALLBACK FOR QUALITY OF SERVICE DEGRADATION

(75) Inventors: Ilya Umansky, San Jose, CA (US); Neil Joffe, Mountain View, CA (US); Shamim Sharifuddin Pirzada, San Jose, CA (US); Dhaval N. Shah, Santa Clara, CA (US)

(73) Assignee: Cisco Technology, Inc., San Jose, CA (US)

Reexamination Request:
No. 90/007,766, Oct. 14, 2005

Reexamination Certificate for:
Patent No.: 6,868,080
Issued: Mar. 15, 2005
Appl. No.: 09/492,423
Filed: Jan. 27, 2000

(*) Notice: This patent is subject to a terminal disclaimer.

Certificate of Correction issued Mar. 21, 2006.

(51) Int. Cl.
*H04L 12/56* (2006.01)
*H04L 12/64* (2006.01)
*H04L 12/28* (2006.01)
*H04L 29/06* (2006.01)
*H04Q 3/00* (2006.01)
*H04M 7/00* (2006.01)

(52) U.S. Cl. .................. 370/354; 370/401; 379/221.01; 379/88.17; 709/238
(58) Field of Classification Search ................... 370/354
See application file for complete search history.

(56) References Cited
U.S. PATENT DOCUMENTS
4,539,676 A * 9/1985 Lucas ........................ 370/354
(Continued)

FOREIGN PATENT DOCUMENTS
CA 2265776 * 4/1998
(Continued)

OTHER PUBLICATIONS

NetWare Multiprotocol Router for ISDN 3.1; Installation and ISDN Configuration Guide; Jun. 1995; 280 pages.
(Continued)

*Primary Examiner*—Albert J Gagliardi

(57) ABSTRACT

The invention provides a way to fallback to a PSTN call at any time during a VoIP call when Quality of Service in a VoIP network falls below some acceptable level. The PSTN fallback calls can be retrieved "midcall" and rerouted back over the VoIP network. This provides optimal utilization of VoIP without sacrificing the quality of the call connection. Calls are cheaper because PSTN fallback calls are only estabilished temporarily for the amount of time that the QoS problem exists on the VoIP network. Call fallback is conducted in a VoIP gateway by first receiving an incoming call. A Voice over IP (VoIP) call is established for the incoming call over the VoIP network. VoIP packets are encoded from the voice signals in the incoming call and sent over the VoIP network. Quality of service of the VoIP network is monitored during the VoIP call and a fallback call is setup over a PSTN network at any time during the VoIP call when the monitored quality of service of the VoIP network degrades. For a time the voice signals from the incoming call are cross connected to both the output for the fallback call and the output for the VoIP call. When a destination gateway starts receiving the voice signals from the fallback call, the VoIP call is dropped. The quality of service on the VoIP network continues to be monitored during the fallback call. A new VoIP call will be reestablished over the VoIP network during the fallback call when the quality of service of the VoIP network improves. Voice from the incoming call is for a time again cross connected to both the fallback call and the new VoIP call. After the destination gateway starts receiving audio packets again over the new VoIP call, the PSTN fallback call is terminated.

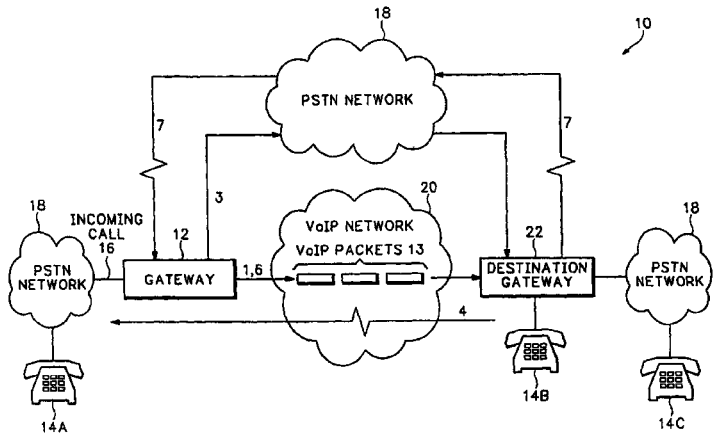

U.S. PATENT DOCUMENTS

| | | | |
|---|---|---|---|
| 4,903,260 A | | 2/1990 | Boettle et al. |
| 4,996,685 A | * | 2/1991 | Farese et al. ............... 370/352 |
| 5,347,516 A | | 9/1994 | Yoshida |
| 5,790,548 A | * | 8/1998 | Sistanizadeh et al. ....... 370/401 |
| 6,064,653 A | * | 5/2000 | Farris ......................... 370/237 |
| 6,069,890 A | * | 5/2000 | White et al. ................ 370/352 |
| 6,292,479 B1 | * | 9/2001 | Bartholomew et al. ..... 370/352 |
| 6,330,316 B1 | * | 12/2001 | Donak et al. ............... 379/196 |
| 6,377,570 B1 | | 4/2002 | Vaziri et al. ................ 370/352 |
| 6,438,218 B1 | * | 8/2002 | Farris et al. ............. 379/88.17 |
| 6,574,216 B1 | * | 6/2003 | Farris et al. ................ 370/352 |
| 6,671,272 B2 | | 12/2003 | Vaziri et al. ................ 370/352 |
| 6,870,827 B1 | * | 3/2005 | Voit et al. ................... 370/352 |
| 6,954,453 B1 | * | 10/2005 | Schindler et al. ........... 370/352 |

FOREIGN PATENT DOCUMENTS

| | | |
|---|---|---|
| EP | 0 732 835 A2 * | 9/1996 |
| EP | 0732835 | 9/1996 |
| EP | 1 014 632 A2 * | 6/2000 |
| GB | 2283154 | 4/1995 |
| JP | 6-311183 | 12/2004 |
| WO | WO 90/12466 | 10/1990 |
| WO | WO 95/25407 | 9/1995 |
| WO | WO 95/31060 | 11/1995 |
| WO | WO96/28947 | 9/1996 |
| WO | WO9523407 | 8/2005 |

OTHER PUBLICATIONS

IDB–64/2; ISDN Dial–Backup Adapter; Controlware GmbH; CWP/EH; Rev. 1.4; May 1997; 3 pages.

TAXI Manager, Network Management Software ISDN; Controlware GmbH; CWP/MK/STD; Rev. 1.3; Aug. 2001; 4 pages.

IDB–384; ISDN Dial–Backup; Controlware GmvH; CWP/MRE; Rev. 1.0; Dec. 1997; 3 pages.

TAXI–System; Advanced ISDN Connectivity; Controlware GmbH; CWO/MK/SSK; Rev. 1.4; Jun. 2004; 6 pages.

TAXI System; IDB–384, IDB–384/128, IDB–512, IDB–1920, ICM–Software Release 4.31; Manual Version 2.0 State: Dec. 1995; 28 pages.

Draft ITU–T Recommendation H.323 entitled *Visual Telephone Systems and Equipment for Local Area Networks which Provide a Non–Guaranteed Quality of Service*, SG15 Plenary May 28, 1996.

Nakamura Y. et al.: *On a Hybrid Network System of Circuit Switching and Packet Switching, The Transactions of the IECE of Japan,* vol. E 65, No. 6, Abstracts.

Low C. et al.: *WEBIN—An Architecture for Fast Deployment of In–Based Personal Services, Workshop Record, Intelligent Network, Freedom and Flexibility: Realising the Promise of Intelligent Network Services,* p. 1–12, Apr. 21, 1996, XP002043670.

Babbage R. et al.: *Internet Phone—Changing the Telephony Paradigm?* BT Technical Journal, vol. 15, No. 2, Apr. 1997, p. 145–147, XP000676853.

Verified translation of EP 1014632 submitted to the United Kingdom Patent Office.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 20, 22 and 24–26 are cancelled.

Claims 1, 12, 21, 23, 27 and 33 are determined to be patentable as amended.

Claims 2–11, 13–19, 28–32 and 34–37, dependent on an amended claim, are determined to be patentable.

1. A method for conducting call fallback in a gateway, comprising:
   receiving an incoming call;
   establishing a Voice over IP (VoIP) call over a VoIP network;
   generating audio packets from the incoming call and sending the audio packets over the VoIP [call] *network*;
   monitoring quality of service on the VoIP network during the VoIP call;
   setting up a fallback call over a circuit switched network during the VoIP call when the monitored quality of service of the VoIP network degrades;
   cross connecting the incoming call to both the fallback call and the VoIP call during midcall of the VoIP call after the fallback call has been setup and sending *the* same audio data over both *the* fallback call and the VoIP call at the same time; and
   redirecting the incoming call from the currently established VoIP call to the fallback call.

12. A VoIP gateway, comprising:
    a telephony interface for receiving an incoming call;
    a VoIP interface for encoding the incoming call into audio packets [;] and *for* sending the audio packets over a VoIP network; and
    a cross connect that sets up a fallback call over the telephone interface and cross connects the incoming call to the fallback call, sending audio data over the fallback call at the same time that the same audio signals for the incoming call are being encoded into audio packets and sent over the VoIP call.

21. [A VoIP gateway according to claim 20] *A VoIP gateway, comprising:*
    *a VoIP interface receiving audio packets from an incoming VoIP call, decoding the audio packets, and outputting the decoded audio packets to an outgoing telephony call;*
    *a telephony interface for receiving a fallback call during the in-progress VoIP call containing same audio data contained in the audio packets and for receiving signaling that associates the fallback call with the VoIP call;* [and]
    *a cross connect that cross connects the fallback call to the outgoing telephony call of the associated VoIP call and drops the VoIP call after receiving audio signals over the fallback call; and*
    including a buffer for receiving the audio packets, the cross connect dropping the VoIP call after the VoIP interface has decoded all the audio packets in the buffer.

23. [A VoIP gateway according to claim 20] *A VoIP gateway, comprising:*
    *a VoIP interface receiving audio packets from an incoming VoIP call, decoding the audio packets, and outputting the decoded audio packets to an outgoing telephony call;*
    *a telephony interface for receiving a fallback call during the in-progress VoIP call containing same audio data contained in the audio packets and for receiving signaling that associates the fallback call with the VoIP call;* [and]
    *a cross connect that cross connects the fallback call to the outgoing telephony call of the associated VoIP call and drops the VoIP call after receiving audio signals over the fallback call; and*
    wherein the cross connect:
    sends a termination signal back to an originating gateway to terminate the VoIP call after receiving a voice signal from the originating gateway through the fallback call;
    continues monitoring the quality of service on the VoIP network during the fallback call after the VoIP call has been terminated;
    sends a request to the originating gateway to establish a new VoIP call when the quality of service of the VoIP network improves; and
    terminates the fallback call after the new VoIP call has been established and VoIP packets from the new VoIP call have been received.

27. A computer readable medium for use with a network processing device, the computer readable medium comprising instructions that when executed by the network processing device perform the following:
    detecting an imcoming call;
    initiating a Voice over IP [(VOIP)] *(VoIP)* call over a VoIP network for the incoming call, *said VoIP call* [that generates], *generating* audio packets from the incoming call and [sends] *sending* the audio packets over the VoIP [call] *network*;
    monitoring quality of service on the VoIP network during the VoIP call;
    initiating a fallback call over a circuit switched network during the VoIP call when the monitored quality of service of the VoIP network degrades;
    cross connecting the incoming call to both the fallback call and the VoIP call during midcall of the VoIP call after the fallback call has been setup and sending *the* same audio data over both the fallback call and the VoIP call at the same time; and
    redirecting the incoming call from the currently established VoIP call to the fallback call.

33. A system for use with a network processing device, the system comprising:
    means for detecting an incoming call;
    means for initiating a Voice over IP (VoIP) call over a VoIP network for the incoming call, *said VoIP call* [that generates] *generating* audio packets from the incoming call and [sends] *sending* the audio packets over the VoIP [call] *network*;

means for monitoring quality of service on the VoIP network during the VoIP call;

means for initiating a fallback call over a circuit switched network during the VoIP call when the monitored quality of service of the VoIP network degrades;

means for cross connecting the incoming call to both the fallback call and the VoIP call during midcall of the VoIP call after the fallback call has been setup and sending *the* same audio data over both the fallback call and the VoIP call at the same time; and means for redirecting the incoming call from the currently established VoIP call to the fallback call.

* * * * *